United States Patent Office 2,875,216
Patented Feb. 24, 1959

2,875,216
METHOD OF PREPARING 1-DEHYDROTESTOSTERONE AND ESTERS THEREOF

Klaus G. Florey, Westfield, N. J., assignor to Olin Mathieson Chemical Corporation, New York, N. Y., a corporation of Virginia No Drawing. Original application September 18, 1956, Serial No. 610,641. Divided and this application July 10, 1957, Serial No. 674,002

2 Claims. (Cl. 260—397.4)

This application is a division of my parent application, Serial No. 610,641, filed September 18, 1956, which in turn is a continuation-in-part of my parent application, Serial No. 547,315, filed November 16, 1955, now abandoned.

This invention relates to the synthesis of steroids and, more particularly, to processes for preparing 1-dehydrotestosterone and esters thereof from 6β,19-seleno-1-dehydrotestosterone and esters thereof.

6β,19-seleno-1-dehydrotestosterone and esters thereof are prepared, as described in said application Serial No. 610,641, by heating to a temperature below 200° C. testosterone or an ester thereof [particularly a hydrocarbon carboxylic acid ester, wherein the acyl radical has less than ten carbon atoms, as exemplified by lower alkanoyl (e. g., formyl, acetyl, propionyl, butyryl and enanthoyl), hydrocarbon aroyl (e. g., benzoyl and toluyl (and hydrocarbon aralkanoyl (e. g., phenylacetyl and β-phenylpropionyl)], with selenium dioxide, preferably in a suitable organic solvent for the steroid reactant, which is unattacked by selenium dioxide under the reaction conditions employed. Suitable organic solvents include ethers (e. g., dioxane), acid anhydrides (e. g., acetic anhydride), tertiary alcohols (e. g., tertiary butanol) and preferably organic acids (especially liquid lower fatty acids, such as acetic acid). The reaction is carried out at an elevated temperature below 200° C., such as one in the range of about 80° C. to about 140° C. (optimally at reflux of the organic solvent, if one is used). At least one mole of selenium dioxide is required for the reaction, but preferably an excess (about 3 to 4 moles) is used. If an ester of testosterone is employed as a reactant, the corresponding ester derivative is initially formed. This ester can then be converted to the free 17-hydroxyl compound by treatment with a base, such as methanolic potassium carbonate.

The product formed is 6β,19-seleno-1-dehydrotestosterone (or an ester thereof) and can be represented by the structural formula

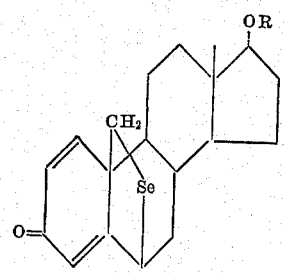

wherein R is hydrogen or an acyl radical (particularly an acyl radical of a hydrocarbon carboxylic acid containing less than ten carbon atoms).

In accordance with the processes of this invention, the 6β,19-seleno-1-dehydrotestosterone (and esters thereof), thus prepared are employed as intermediates in the preparation of 1-dehydrotestosterone. This conversion can be effected by either of two methods. Employing one of the alternative procedures, 6β,19-seleno-1-dehydrotestosterone (or an ester thereof) is heated with a pyrophoric form of nickel (e. g., Raney nickel). According to the other alternative procedure, 6β-19-seleno-1-dehydrotestosterone (or an ester thereof) is pyrolized by heating to a temperature of about 300° C. to about 500° C. (optimally about 350° C. to about 370° C. in vacuo) to yield 1-dehydrotestosterone.

The following examples illustrate the invention:

EXAMPLE 1

6β,19-seleno-1-dehydrotestosterone acetate

A mixture of 2.0 g. of testosterone acetate (Δ⁴-androstene-17β-ol-3-one 17-acetate) and 2.0 g. of selenium dioxide in 8 ml. of acetic acid is refluxed for one hour, cooled to room temperature and filtered from selenium. The filtrate is diluted with 50 ml. of chloroform and washed with water and sodium bicarbonate solution. The solvent is evaporated, and the resulting residue, upon crystallization from acetone-hexane, yields about 700 mg. of a crystalline substance, 6β,19-seleno-1-dehydrotestosterone acetate, having the following properties: M. P. about 152–157° C.; $[\alpha]_D^{25} + 125$ (c., 0.62 in chloroform);

$\lambda_{max}^{alc}$ 244 mμ(ε=7,930); 257 mμ(ε=7,800); 306 mμ(ε=889); $\lambda_{max}^{Nujol}$ 5.76μ (acetyl), 6.10μ, 6.17μ, 6.27μ(Δ¹,⁴-3-keto).

Analysis.—Calculated for $C_{21}H_{26}O_3Se$ (405.38): C, 62.22; H, 6.47; Se, 19.49. Found: C, 63.06; H, 7.07; Se, 17.85.

In a similar manner, upon the substitution of other esters of testosterone (e. g., testosterone propionate and testosterone enanthate) for testosterone acetate in the procedure of Example 1, the corresponding ester derivatives (e. g., the propionate and enanthate analogues) are formed. Furthermore, when the process is repeated with dioxane substituted for the acetic acid, the same product is obtained.

EXAMPLE 2

6β,19-seleno-1-dehydrotestosterone

To 400 mg. of 6β,19-seleno-1-dehydrotestosterone acetate in 40 ml. of ethanol was added 2 ml. of a 10% aqueous potassium carbonate solution. The mixture is refluxed for 3 hours, diluted with chloroform and washed with water. Evaporation of the solvent and subsequent crystallization from methanol yields about 180 mg. of the crystalline substance, 6β,19-seleno-1-dehydrotestosterone, having the following properties: M. P. about 273–275° C.; $[\alpha]_D^{23} -4.6°$ (c., 0.54 in chloroform);

$\lambda_{max}^{alc}$ 245 mμ(ε=10,800); 257 mμ(ε=10,700); 307 mμ (ε=1,170); $\lambda_{max}^{Nujol}$ 2.87μ(17–OH), 6.10μ, 6.20μ, 6.28μ (Δ¹,⁴-3-keto).

Analysis.—Calculated for $C_{19}H_{24}O_2Se$ (363.34): C, 62.80; H, 6.66; Se, 21.73. Found: C, 62.58; H, 6.76; Se, 22.12.

EXAMPLE 3

1-dehydrotestosterone

To 200 mg. of 6β,19-seleno-1-dehydrotestosterone in 18 ml. of benzene is added 4 ml. of Raney nickel in 4 ml. of ethanol. The mixture is refluxed for 5 hours. The mixture is filtered from nickel, washed with water and concentrated to dryness in vacuo. The residue, upon crystallization from etherhexane, yields 1-dehydrotestosterone, identical with an authentic sample.

EXAMPLE 4

*1-dehydrotestosterone acetate and 6-dehydrotestosterone acetate*

300 mg. of 6β,19-seleno-1-dehydrotestosterone acetate is heated to 350-370° C. at 1 mm. pressure for 30 minutes. The reaction mixture is diluted with chloroform, filtered from selenium, washed with water and concentrated to dryness in vacuo. The residue is chromatographed on alumina, and the following portions in order of elution are obtained with hexane-benzene and benzene-ether solvent mixtures: (a) 1-dehydrotestosterone acetate, M. P. 151-153° C., identical with authentic material, and (b) mixtures of 1-dehydrotestosterone acetate and 6-dehydrotestosterone acetate, identified by ultraviolet marima in the 240 m$\mu$ and 280 m$\mu$ regions.

The invention may be otherwise variously embodied within the scope of the appended claims.

I claim:

1. A process for preparing a compound selected from the group consisting of 1-dehydrotestosterone and esters thereof, which comprises heating to a temperature of about 300° C. to about 500° C. a compound selected from the group consisting of 6β,-19-seleno-1-dehydrotestosterone and esters thereof and recovering the 1-dehydrotestosterone formed.

2. A process which comprises heating a compound selected from the group consisting of 6β,19-seleno-1-dehydrotestosterone and esters thereof in the presence of a pyrophoric form of nickel and recovering the corresponding 1-dehydro steroid selected from the group consisting of 1-dehydrotestosterone and esters thereof.

References Cited in the file of this patent

Chem. Reviews by Watkins, vol. 36 (1945), page 249.
Schwenk: Arch. Biochem. 14, 125 (1947).
McKenzie: J. Biol. Chem. 173, 271 (1947).
Ringold: J. Org. Chem. 1956, 21, 239.
Szpilfogel: Rec. Trav. Chim., 1956, 75, 475.
Meystre: Helv. Chim. Acta., 1956, 39, 734.